United States Patent
Ghaffar

(10) Patent No.: US 7,200,860 B2
(45) Date of Patent: Apr. 3, 2007

(54) METHOD AND SYSTEM FOR SECURE NETWORK SERVICE

(75) Inventor: Junaid Ghaffar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 854 days.

(21) Appl. No.: 10/379,613

(22) Filed: Mar. 5, 2003

(65) Prior Publication Data

US 2004/0177273 A1    Sep. 9, 2004

(51) Int. Cl.
*H04L 9/00* (2006.01)

(52) U.S. Cl. ............ 726/2; 726/3; 726/4; 726/13; 709/201; 709/213; 709/217; 709/224; 709/230; 709/249

(58) Field of Classification Search .......... 726/2, 726/3, 4; 709/201, 213, 217, 224, 230, 249
See application file for complete search history.

(56) References Cited

U.S. PATENT DOCUMENTS

| | | | |
|---|---|---|---|
| 5,832,457 A | 11/1998 | O'Brien et al. ............ 705/14 |
| 5,901,352 A * | 5/1999 | St-Pierre et al. ......... 455/426.1 |
| 6,223,215 B1 | 4/2001 | Hunt et al. ............ 709/217 |
| 6,366,957 B1 * | 4/2002 | Na ............... 709/229 |
| 6,377,935 B1 | 4/2002 | Deaton et al. ............ 705/14 |
| 6,453,353 B1 * | 9/2002 | Win et al. ............ 709/229 |
| 6,754,716 B1 * | 6/2004 | Sharma et al. ............ 709/238 |
| 6,889,206 B1 * | 5/2005 | Nuttall ............ 705/52 |
| 2002/0046257 A1 | 4/2002 | Killmer ............ 709/218 |
| 2002/0099731 A1 | 7/2002 | Abajian ............ 707/500 |
| 2002/0145992 A1 | 10/2002 | Holt ............ 370/338 |
| 2004/0006586 A1 * | 1/2004 | Melchione et al. ......... 709/201 |
| 2004/0203603 A1 * | 10/2004 | Pierce et al. ............ 455/411 |
| 2006/0107036 A1 * | 5/2006 | Randle et al. ............ 713/153 |

* cited by examiner

*Primary Examiner*—Taghi T. Arani
(74) *Attorney, Agent, or Firm*—Hamilton & Terrile, LLP; Robert W. Holland

(57) ABSTRACT

A system and method for providing a secure network service to an information handling system compares the detected network address of a service network location that calls a service on the information handling system with a list of authorized network addresses and denies access to confidential information of the information handling system if the detected network address is not authorized to obtain confidential information from the service. For instance, a service security module loaded on the information handling system detects the URL or domain of a service network location and ensures that the URL or domain is on an authorized list of addresses before service functions are allowed to access confidential information associated with the information handling system.

19 Claims, 2 Drawing Sheets

METHOD AND SYSTEM FOR SECURE NETWORK SERVICE

BACKGROUND OF THE INVENTION

1. Field of the Invention

The present invention relates in general to the field of network services, and more particularly to a method and system for secure network service to an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Improvements in network communication speed and capacity for communicating information between information handling systems have resulted in a greater use of network-based services provided for and through information handling systems. One goal of information handling system manufacturers, network access providers and network content providers is to deploy network-based services that have automated functions with minimal disruption experienced by information handling system users. For instance, a service installed at manufacture of the information handling system is able to access information associated with the information handling system and its purchaser either from local storage of the information handling system or from stored information at the manufacturer. Once a service is installed on an information handling system, network locations, such as Web sites, contact and validate the presence of the service to download information related to the information handling system. One specific use for a service is to update information handling systems with support and bug fixes installed automatically, such as updated software and firmware for components, including updated component drivers. Service are provided through a variety of software architectures, such as ActiveX objects and the Micorsoft .NET architecture.

One difficulty with automated services provided through networks is that confidential information becomes accessible to any Web site able to validate the presence of a service on an information handling system, thus presenting privacy and security issues. Where a service downloads and installs programs to an information handling system, such as with maintenance programs, a potential exists for installation of malicious programs that illicitly obtain confidential information or otherwise perform unauthorized functions on the information handling system, such as viruses or programs that launch malicious attacks. The effectiveness of network-based services is dramatically decreased where users of information handling systems hesitate to trust the confidentiality and security of the services.

SUMMARY OF THE INVENTION

Therefore a need has arisen for a method and system which prevents access of confidential information from information handling systems by unauthorized network-based services.

In accordance with the present invention, a method and system are provided which substantially reduce the disadvantages and problems associated with previous methods and systems for providing security for network-based services. The network location address of a network service that requests confidential information from an information handling system is compared with an authorized access list so that access to the confidential information is denied if the network location is not authorized and allowed if the network location is authorized.

More specifically, a service security module loaded on an information handling system detects the network address of a network location that calls a service of the information handling system and compares the address with a network service access list to permit or deny access of confidential information by the service. If a network location that calls a service or initiates a service function to obtain confidential information is not on the network access list, the service security module prevents access of the service to the confidential information and a display module displays a warning of the unauthorized access attempt to the information handling system user. If a network location that calls a service or initiates a service function to obtain confidential information is on the network access list, the service security module permits access of the service to the confidential information. One example of a service is a maintenance service provided by an information handling system manufacturer which updates the network service access list to permit downloads of updates from service network locations associated with suppliers of information handling system components. Thus, updates and fixes are automatically downloaded and installed with network services from authorized service network locations with reduced risk of installation of malicious programs.

The present invention provides a number of important technical advantages. One example of an important technical advantage is that unauthorized network-based services are denied access to confidential information of an information handling system while authorized network-based services are permitted access to the confidential information without disruption of the user of the information handling system. Authorized network locations for access to defined services are populated to the information handling system at manufacture by loading a list of network addresses and/or domains associated with authorized network locations and then updated periodically thereafter by updating the list. Allowing or denying access by a network location to confidential information is determined real time by comparing the network address for the location with the list of authorized addresses in a manner invisible to the information handling system user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Secure network service is provided to information handling systems by confirming authorization of a service network location to receive confidential information from the information handling system before release of the confidential information. An access list of authorized network addresses is compared with the network address detected from the service network location to deny access to confidential information of the information handling system to unauthorized network locations. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
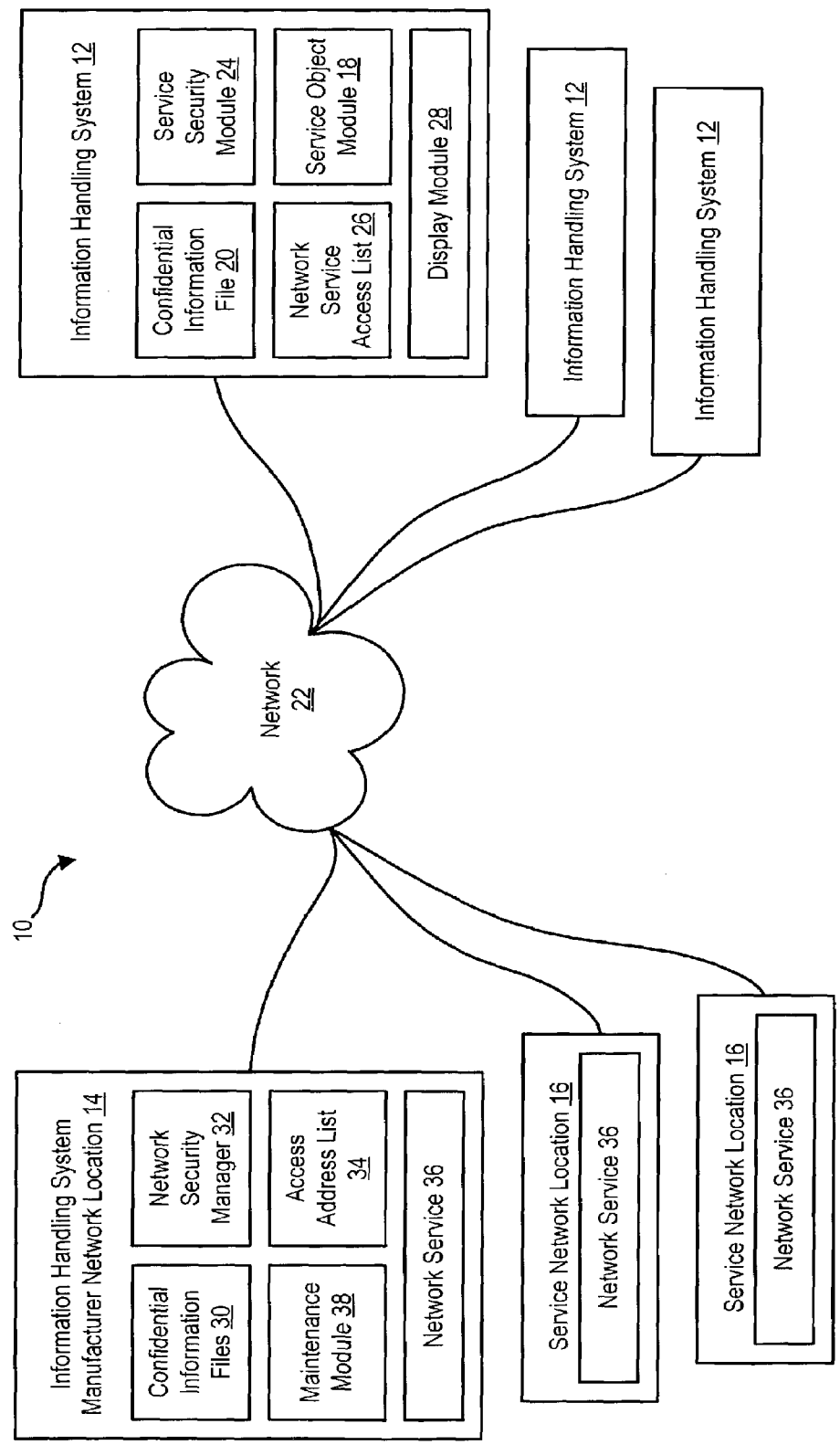
FIG. 1 depicts a block diagram of a system for secure network service to an information handling system.

Referring now to FIG. 1, a block diagram depicts a network service security system 10 that limits access of confidential information associated with information handling systems 12 to authorized service network locations 14 and 16. One or more service/object modules 18 reside on each information handling system 12 to provide a service. For instance, service/object modules 18 are ActiveX objects or Microsoft .NET service solutions that access confidential information from a confidential information file 20 to provide a service to information handling system 12. As an example, a service/object module 18 provides user-confidential system configuration settings for an information handling system 12 to a service network location 14 or 16 in order to download and install a maintenance update specific to the information handling system. As another example, a service/object module 18 provides billing information for a user associated with information handling system 12, such as billing information stored on network location 14 associated with the manufacturer of information handling system 12. The billing information is collected at purchase of information handling system 12 and associated with a unique identifier assigned by the manufacturer and communicated by service object module 18 to authorize release of the billing information. Service/object module 18 requests an initial Web page through a network 22 from a server information handling system, such as an information handling system manufacturer network location 14 or service network locations 16, which sends the requested page to initiate module 18. If the page initiates a function of service/object module 18 that requests confidential information from confidential information file 20, then a service security module 24 confirms authorization for the release of the confidential information. Service security module 24 detects the network address associated with the request for confidential information and compares the network address with authorized network addresses identified in a network service access list 26. If the network address associated with a request for confidential information is not found in network service access list 26, then access by that address is denied and a warning of an unauthorized access attempt is displayed at the information handling system 12 by a display module 28. If the network address associated with a request for confidential information is in network service access list 26, then access by that address is permitted and a notice of the confidential information provided in response to the request is displayed at information handling system 12 by display module 28. In one embodiment, the authorized list of network addresses may include local file system locations authorized to retrieve confidential information. In another embodiment, authorized service network locations obtain confidential information from confidential information files 30 available on information handling system manufacturer network location 14 if approved by service security module 24 by reference to a unique identifier for information handling system 12.

Network service access list 26 defines services approved to access confidential information by associating the service to one or more authorized network addresses, such as uniform resource locators ("URL") or network domains. Network service access list 26 is populated with authorized network addresses at manufacture and periodically updated by information handling system manufacturer network location 14. For instance, a network security manager 32 periodically updates network service access list 26 to add network addresses associated with authorized service network locations 16 when network services 36 are authorized through the manufacturer of information handling system 12. As one example of a network service authorized by the manufacturer of information handling system 12, a maintenance module 38 aids in maintenance of information handling system components provided to the manufacturer by third party suppliers, such as hard disk drives, modems, processors, motherboards, etc. . . . An ActiveX service object/module 18 on information handling system 12 interfaces with a network service 36 of manufacturer network location 14 to obtain service network locations 16 having updates for components used at manufacture. Service security module 24 updates network service access list 26 with authorized network location addresses from network security manager 32 for access of confidential configuration information to perform maintenance updates. ActiveX service/object module 18 then initiates a secure connection with service network locations 16 to download component updates from network services 36.

Figure 2:
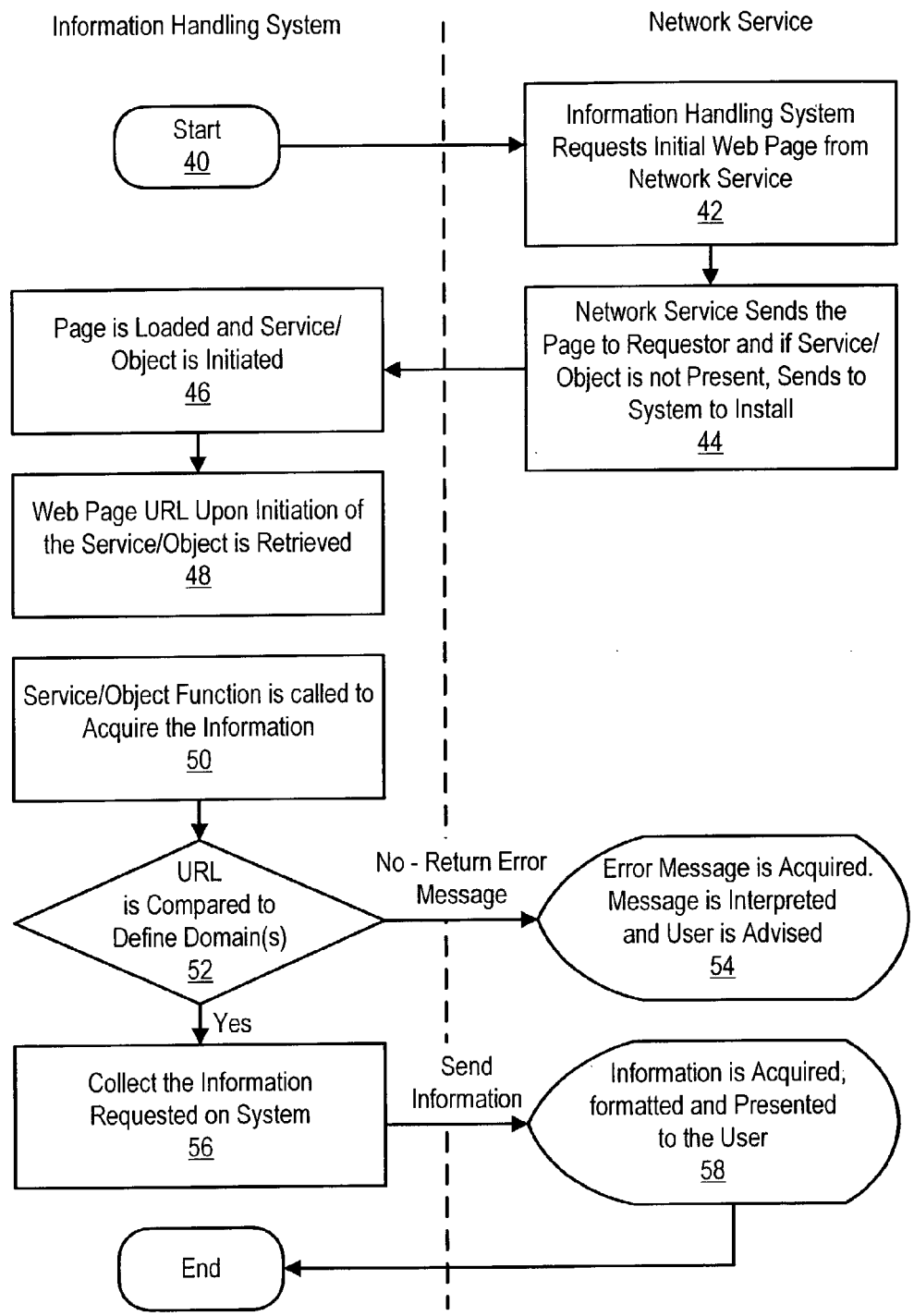
FIG. 2 depicts a flow diagram of a process for secure network service to an information handling system.

Referring now to FIG. 2, a flow diagram depicts a process for secure network service to an information handling system with information communicated between an information handling system and a network service at a network location. The process begins at step 40 at which a service is called at an information handling system, such as through a user input or a periodic activation. At step 42, the information handling system requests an initial Web page from a network service by communicating the request through a network, such as the Internet, to a network address identified by the service/object module. At step 44, the network service sends the requested page to the information handling system and, if the service/object called for by the request is not present on the information handling system, also sends a copy for installation.

At step 46, the Web page from the network service is loaded on the information handling system to initiate the service/object module functions. At step 48, the URL of the Web page upon initiation of the service/object is detected, such as the Web page initially contacted or the Web page or pages identified to receive information from the information handling system. Alternatively, the Web page or domain name may be detected from the code, registry or file called by the service. At step 50, the service/object is called to acquire confidential information from the information handling system. At step 52, the detected address is compared with defined addresses or domains having authorization to receive the confidential information to determine whether the detected address is associated with an authorized location. If the detected network location is not authorized to receive confidential information, access is denied and the process continues to step 54 to display an error message. If the detected network address is authorized the process continues to step 56 for collection of the information and, at step 58, the information is sent to the network location. In one embodiment, the user of the information handling system is offered an opportunity to over ride denial of access to unauthorized network locations. In another embodiment, a notice is presented at the information handling system before information is sent to authorized network locations. In yet another embodiment, authorization to different network locations varies with specific types of confidential information. For instance, different service modules are provided with different access authorization levels, such as by associating each service module with its own network service access list.

Although the present invention has been described in detail, it should be understood that various changes, substitutions and alterations can be made hereto without departing from the spirit and scope of the invention as defined by the appended claims.

What is claimed is:

1. A system for providing a secure network service to an information handling system, the system comprising:
    plural network locations, each network location having a network address and operable to call a service loaded on the information handling system;
    a service loaded on the information handling system, the service operable to access confidential information associated with the information handling system;
    a network service access list having a list of the plural network addresses authorized to access the confidential information associated with the information handling system; and
    a service security module interfaced with the service and the network service access list, the service security module operable to detect the network address of a network location that calls the service and to compare the network address with the network service access list to limit access to the confidential information to the authorized network locations.

2. The system of claim 1 wherein the service comprises an ActiveX object.

3. The system of claim 1 further comprising a confidential information file having the confidential information associated with the information handling system, the confidential information file stored on the information handling system for access by the service.

4. The system of claim 1 further comprising a confidential information file having the confidential information associated with the information handling system, the confidential information file stored at a secure information network location for access by the service.

5. The system of claim 1 further comprising a security warning module interfaced with the service security module and operable to display a warning at the information handling system if a network address that calls the service to obtain the confidential information is not on the network service access list.

6. The system of claim 5 wherein the security warning module is further operable to notify a secure information network location if a network address that calls the service to obtain confidential information is not on the network service access list.

7. The system of claim 1 wherein the service comprises a maintenance module operable to download and install updates for the information handling system.

8. A method for providing a secure network service to an information handling system, the method comprising:
    defining a set of plural network locations by address that are authorized to access confidential information associated with the information handling system;
    storing the plural network addresses on the information handling system;
    initiating a service on the information handling system from a network location having an associated address;
    detecting at the information handling system the address associated with network location that is initiating the service;
    calling a function of the service to access confidential information of the information handling system; and
    denying access by the service to the confidential information if the detected address is not in the set of network locations authorized to access the confidential information and stored on the information handling system.

9. The method of claim 8 further comprising allowing access by the service to the confidential information if the detected address is in the set of network locations authorized to access confidential information.

10. The method of claim 8 wherein the service comprises an ActiveX object.

11. The method of claim 8 wherein the service comprises a .NET service.

12. The method of claim 8 wherein a network location address comprises a URL.

13. The method of claim 8 wherein a network location address comprises a domain name.

14. The method of claim 8 wherein initiating a service further comprises downloading the service to the information handling system.

15. The method of claim 8 further comprising displaying a warning at the information handling system if a service is denied access to confidential information.

16. The method of claim 8 wherein the service comprises downloading and installing an update to the information handling system.

17. An information handling system comprising:
plural service modules, each service module having a function operable to provide confidential information in response to a call from a service network location;
a confidential information file storing the confidential information;
a network service access list associated with each service module, each network service access list having one or more network location addresses that are authorized to access the confidential information; and
a service security module interfaced with the service module and the network service access list, the service security module operable to detect the network address of a service network location that calls the service module and to confirm that the detected address is authorized to access the confidential information.

18. The information handling system of claim 17 wherein the service security module is further operable to update the network service access list with one or more network addresses authorized to access the confidential information.

19. The information handling system of claim 17 further comprising a display module operable to display a warning for a detected attempt to access confidential information by an unauthorized network location and further operable to display a notice of an access of confidential information by an authorized network location.

* * * * *